United States Patent
Schwarzbek et al.

(10) Patent No.: US 9,574,679 B2
(45) Date of Patent: Feb. 21, 2017

(54) DEVICES AND METHODS FOR A MECHANICAL AUTOMATIC SHUT-OFF TO FLUID RESERVOIRS

(71) Applicant: People and Products-Plumbing LLC, Franklin, MI (US)

(72) Inventors: Craig Schwarzbek, Grand Rapids, MI (US); Robert Penfil, West Bloomfield, MI (US); Sylvia Penfil, West Bloomfield, MI (US); Howard Brown, Franklin, MI (US); Bruce Skolnik, West Bloomfield, MI (US); Jeff Kaczperski, China Township, MI (US)

(73) Assignee: PEOPLE AND PRODUCTS PLUMBING, LLC, Franklin, MI (US)

( * ) Notice: Subject to any disclaimer, the term of this patent is extended or adjusted under 35 U.S.C. 154(b) by 0 days.

(21) Appl. No.: 14/345,085

(22) PCT Filed: Oct. 19, 2012

(86) PCT No.: PCT/US2012/061112
§ 371 (c)(1),
(2) Date: Mar. 14, 2014

(87) PCT Pub. No.: WO2013/059653
PCT Pub. Date: Apr. 25, 2013

(65) Prior Publication Data
US 2014/0373924 A1  Dec. 25, 2014

Related U.S. Application Data

(60) Provisional application No. 61/549,842, filed on Oct. 21, 2011.

(51) Int. Cl.
*F16K 31/18* (2006.01)

(52) U.S. Cl.
CPC .......... *F16K 31/18* (2013.01); *Y10T 137/0318* (2015.04); *Y10T 137/7439* (2015.04)

(58) Field of Classification Search
CPC ............... F16K 31/18; Y10T 137/7439; Y10T 137/0318
See application file for complete search history.

(56) References Cited

U.S. PATENT DOCUMENTS

| | | |
|---|---|---|
| 2,724,401 A | 11/1955 | Page |
| 4,909,274 A | 3/1990 | Rodriguez |
| (Continued) | | |

OTHER PUBLICATIONS

International Search Report and Written Opinion of the International Searching Authority, date of mailing Mar. 26, 2013 for PCT/US2012/061112 (11 pgs.).

*Primary Examiner* — Mary McManmon
*Assistant Examiner* — Daphne M Barry
(74) *Attorney, Agent, or Firm* — Fitch, Even, Tabin & Flannery, LLP

(57) ABSTRACT

Embodiments are provided for an automatic fluid shut off device having a float disposed in a fluid catch basin attached to a first end of a rod movable in a direction of rising fluid in the catch basin; a second rod end extending to a fluid supply base and terminating adjacent to a restrained latch arm end, the latch arm end configured to be pivotably displaceable upon a force by the second rod end in response to a rising fluid in the catch basin; the latch arm pivotably connected to a shut-off valve; and the shut off valve retained in an open position while the latch arm is restrained, and under a rotational force to close the shut-off valve upon a release of the latch arm in response to the force by the second rod end. The latch arm can be restrained by a latch arm retention notch extending downward and inward.

12 Claims, 8 Drawing Sheets

(56) References Cited

U.S. PATENT DOCUMENTS

| | | | | |
|---|---|---|---|---|
| 4,938,453 | A | * | 7/1990 | Blanchard ............... F16K 31/44 251/313 |
| 5,027,870 | A | * | 7/1991 | Butterfield ............. F16K 21/18 137/409 |
| 5,518,024 | A | * | 5/1996 | Weeks .................... B65D 90/26 116/227 |
| 6,240,954 | B1 | * | 6/2001 | Bereznai ............... F16K 31/265 137/312 |
| 6,253,785 | B1 | | 7/2001 | Shumake, Jr. et al. |
| 6,336,469 | B1 | * | 1/2002 | Nixon .................... F16K 31/563 122/504 |
| 6,533,243 | B1 | * | 3/2003 | Sumner ................ F16K 31/602 251/303 |
| 6,783,330 | B2 | * | 8/2004 | Carnes .................... F04D 9/042 137/202 |
| 6,886,589 | B2 | * | 5/2005 | Oretti .................... A01G 27/003 137/416 |
| 7,128,102 | B2 | * | 10/2006 | Pendleton ............. F16L 15/001 137/434 |
| 7,174,912 | B2 | * | 2/2007 | Lowe ...................... E03C 1/052 137/434 |
| 7,665,482 | B2 | | 2/2010 | McLean |
| 8,631,818 | B2 | * | 1/2014 | Mitrovich ............. B60K 15/04 137/429 |
| 9,080,689 | B2 | * | 7/2015 | Ariizumi ............... F16K 31/265 |
| 2013/0213480 | A1 | * | 8/2013 | Higgins ................ B67D 7/365 137/1 |

* cited by examiner

DEVICES AND METHODS FOR A MECHANICAL AUTOMATIC SHUT-OFF TO FLUID RESERVOIRS

CROSS REFERENCE TO RELATED APPLICATIONS

This application is a U.S. national phase application of International Application No. PCT/US2012/061112, filed Oct. 19, 2012, which claims benefit of U.S. Provisional Application 61/549,842, filed Oct. 21, 2011, which are hereby incorporated herein by reference in their entirety.

FIELD

The embodiments described herein provide fluid shut-off devices and methods, and specifically fluid shut-off devices and methods using mechanical action of a float to activate a spring loaded shut-off valve.

BACKGROUND

Water damage from leaking water reservoirs, such as hot water tanks, dishwashers, and the like, cause damage to many homes each year. Some devices and methods in the art have been developed to attempt detection and shut-off of water leaks from such reservoirs. These devices are typically complicated, expensive and often require the use electrically powered means to shut off the water supply if a leak is detected. One such system is sold under the trade name FLO-LOGIC of Raleigh, N.C., is dependant on electric power. These types of devices could potentially provide no protection if the electronic means fails or electrical power is interrupted.

Other attempts to provide automatic fluid shut-off capability can include a dissolving component, such as one sold under the trade name WAGS valve by Taco, Inc. of Cranston, R.I. Again, this type of system is complicated, expensive and requires the plumbing be run at floor level. Other complicated, space consuming, inefficient, and cost-ineffective attempts are also known (See generally, U.S. Pat. Nos. 7,665,482, 6,253,785 and 2,724,401).

Accordingly, the known processes to shut off a water supply from a leaking water reservoir provide significant advances in the art, but further advances are possible and desired.

SUMMARY

The embodiments described below provide mechanical fluid shut-off devices and methods, and specifically fluid shut-off devices and methods using a mechanical action of a float to activate a spring loaded shut-off valve.

In one embodiment, an automatic fluid shut off device is provided having a float disposed in a fluid catch basin attached to a first end of a rod movable in a direction of rising fluid in the catch basin; a second rod end extending to a fluid supply base and terminating adjacent to a restrained latch arm end, the latch arm end configured to be pivotably displaceable upon a force by the second rod end in response to a rising fluid in the catch basin; the latch arm pivotably connected to a shut-off valve; and the shut off valve retained in an open position while the latch arm is restrained, and under a rotational force to close the shut-off valve upon a release of the latch arm in response to the force by the second rod end. The latch arm can be restrained by a latch arm retention notch extending downward and inward at about a 3.5 degree angle.

In some embodiments, an overall buoyancy force of the float can be, for example, up to about 1.5 pounds (about 680 gms) against the latch arm and the rotational force against the shut-off valve is at least about 18 pounds (about 8200 gms).

In some embodiments, the rotation force can be supplied by a torsion spring. The torsion spring can have first and second ends generally in parallel and wherein the first torsion spring can be connected to a handled rotatably attached to the shut-off valve and the second torsion spring end is attached to the base. The torsion spring can be formed from music wire with a diameter of about 0.105 inches (about 2-3 mms).

In some embodiments, the shut-off valve can be a ¾" (about 19 mms), four bolt, quarter-turn ball valve. The base and latch arm can be formed from a variety of materials such as an acetal polymer.

In some embodiments, the catch basin can be disposed under a water heater and configured to displace the latch arm to a point of release in response to about 1 to 2 inches of water (about 25-50 mms) in the catch basin.

The current embodiments also provide a method to shut off a water supply, which can have the steps of: providing a first force in response to unanticipated presence of a fluid; displacing a restrained latch arm connected to a shut-off valve handle past a stop in response to the first force; rotating the shut-off valve connected to a fluid supply by a second force in response to a latch arm displacement beyond a release point. It is noted that the term force as used herein describes the overall weight equivalent of effort acting on the specific element described.

In some methods, the restrained latch arm can be restrained by the second force. In some embodiments, the first force can be provided by a buoyancy force and the second force is provided by a coil spring. The first force can be, for example, up to about 1.5 pounds (about 680 gms) and the second for is at least 18 pounds (about 8200 gms).

Other features will become more apparent to persons having ordinary skill in the art to which pertains from the following description and claims.

BRIEF DESCRIPTION OF THE FIGURES

The foregoing features, as well as other features, will become apparent with reference to the description and figures below, in which like numerals represent elements, and in which.

DETAILED DESCRIPTION

The embodiments described below provide mechanical and non-electrical fluid shut-off devices and methods, and specifically fluid shut-off devices and methods using a mechanical action of a float to activate a spring loaded shut-off valve (such as a spring loaded quarter-turn ball valve). In some cases the embodiments can be actuated upon a failure of a fluid reservoir. While the present embodiments are described for a catch basin disposed under a water heater, it is noted that other configurations can be considered within the scope of the presented embodiments. Such configurations could also include any applications involving water supplies and other fluids and gases supplied under pressure, and appliances such as ice-maker water supplies, dishwashers, clothes washers, gas lines, irrigation systems, and the like.

An advantage of the present embodiments is to provide a solely mechanical actuatable shut off valve upon detection of an irregular flow of the fluid or gas. In one instance an event such as raising a rod attached to a float urging an end of a spring loaded paw/latch arm past its retention point to force rotation of a ball valve to shut off the fluid supply. Such a device is not dependant on electrical power supply for actuation.

In one embodiment, the device can shut off the flow of liquid from a float disposed in a catch basin. In use, as unanticipated fluid accumulates in the catch basin, the float rises with the accumulated liquid. As the float rises it can lift a pivoting lever arm acting as a fulcrum. A rod connected at some point along the lever arm lifts with the float and lever arm to apply a force against a latch arm end attached to a handle of a spring loaded valve. As the end of the latch arm rises with the rod, it reaches a release point, allowing a torsion spring to force a valve handle to a closed valve position, thus stopping the flow of any liquid or gas from the supply.

Figure 1:
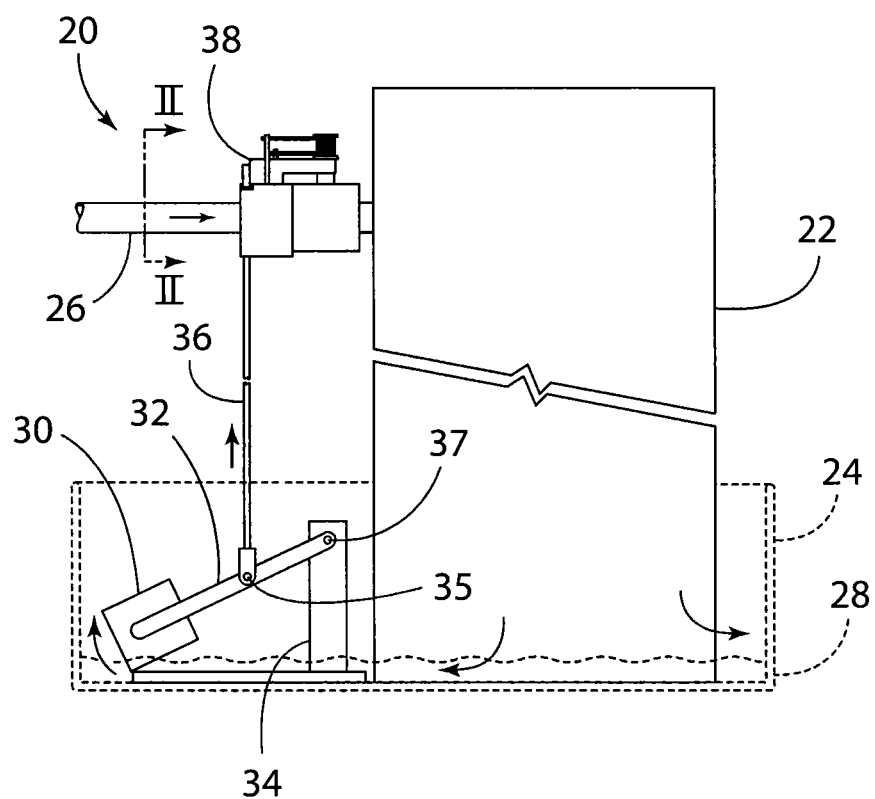
FIG. 1 is side view of an embodiment of the present devices configured for use with a water heater.
Figure 2:
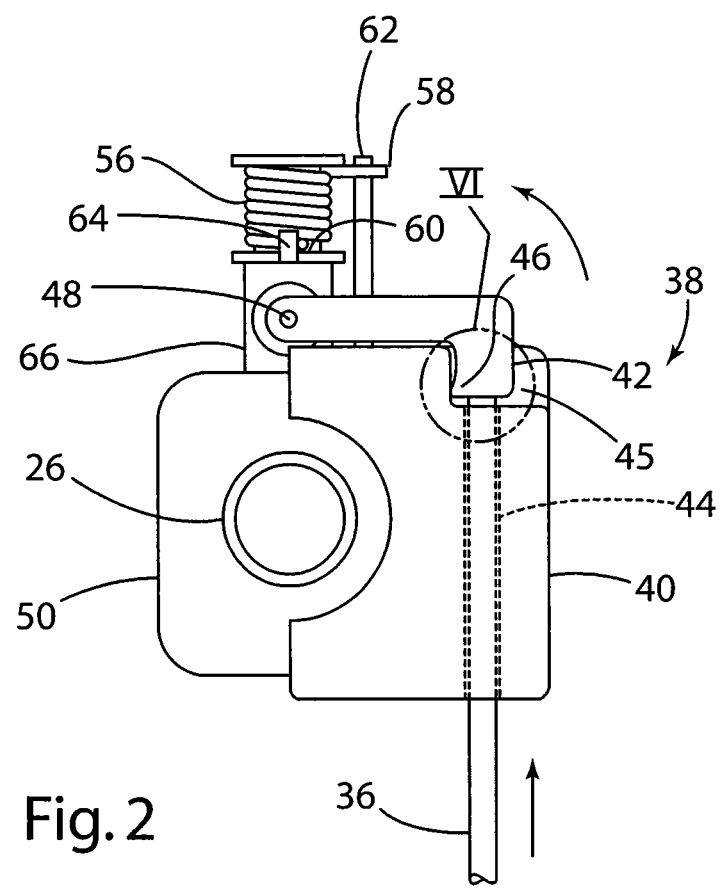
FIG. 2 is a sectional view of an embodiment of the present devices taken along section lines II-II in FIG. 1.
Figure 7:
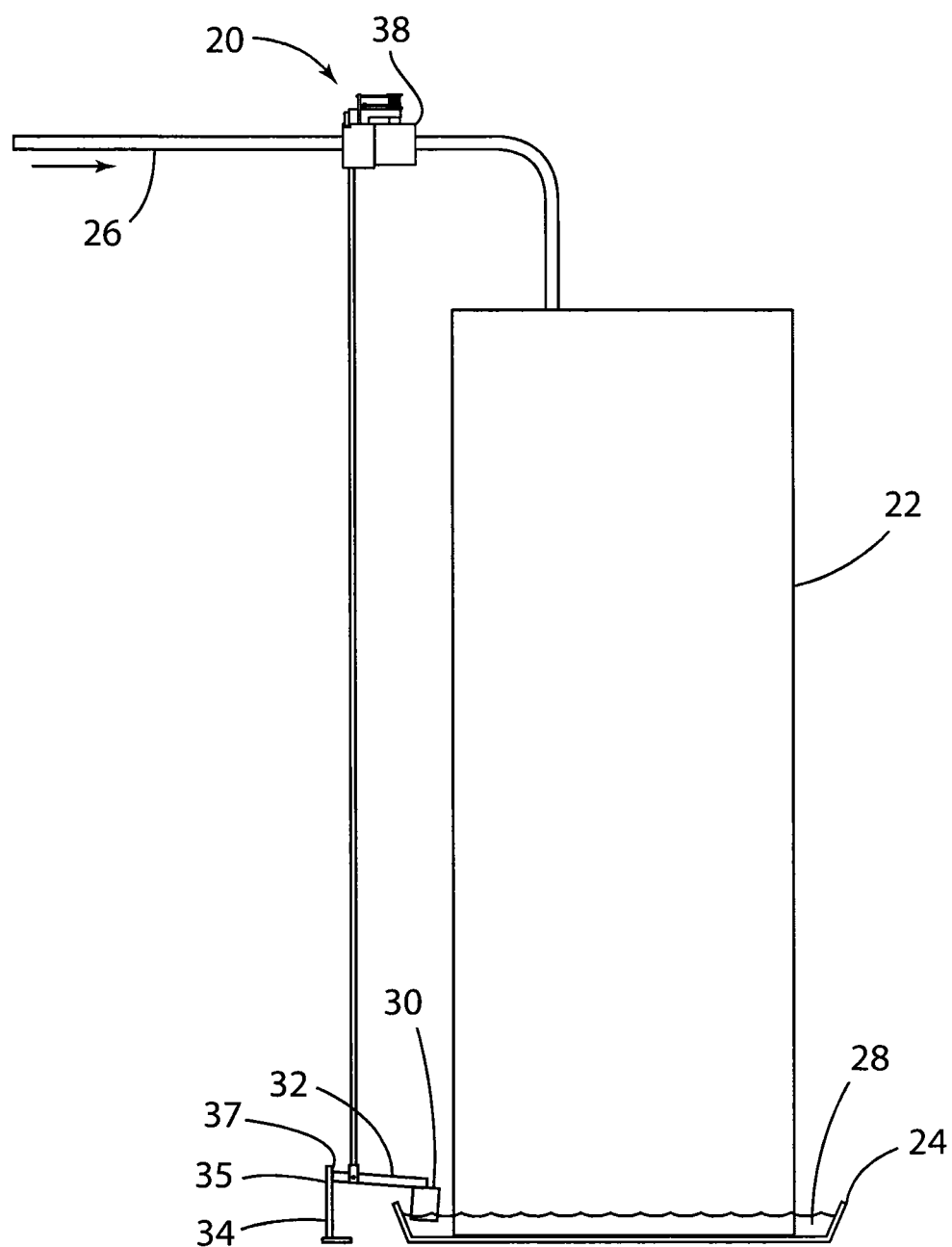
FIG. 7 is an alternate embodiment of the present devices configured for use with a water heater.
Figure 9:
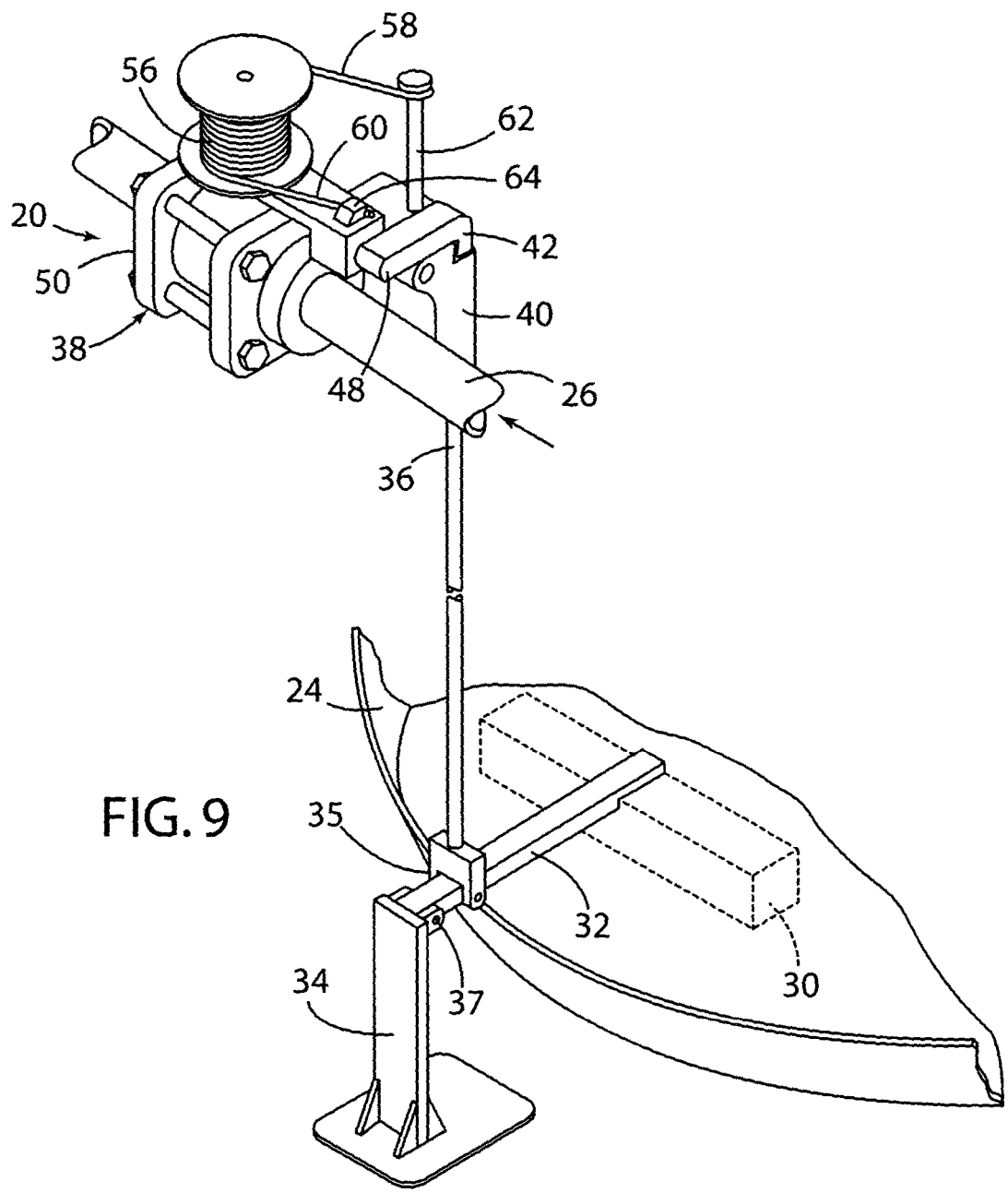
FIG. 9 is a perspective view of an embodiment of the present devices.

Accordingly, for illustrative purposes only, described herein is one embodiment of the present device configured for use as a shut-off valve for the water supply to a water heater. Turning now to the figures, there is shown an automatic fluid shut-off device generally indicated at 20 (FIG. 1). As shown, a fluid 28 is fed to a fluid reservoir, such as a water heater 22, by a fluid/water supply 26. Surrounding the bottom of water heater 22 a catch basin 24 can be provided to receive fluid, such as upon failure of the fluid reservoir 22. In one embodiment, such as shown in FIG. 7, catch basin 24 can have a depth in the range of up to the height of the reservoir, but preferably about 2.5 (about 64 mms) to 3.5 inches (about 89 mms), though many variations are possible within the scope of the present embodiments. Catch basin 24 can have a variety of shapes and sizes and made from a variety of materials such as plastics, ceramics, glass, masonry, and the like. In some embodiments catch basin 24 can even be a perimeter damn formed around the fluid reservoir. The size of the catch basin should be limited to allow for a minimal 'footprint' on the floor where water heater 22 is located. For example, in one embodiment, catch basin 24 can have an interior diameter about 4 inches (about 100 mms) greater than the outer diameter of the water heater. In this example, catch basin 24 would have a clearance of a minimum of two inches (about 50 mms) outside of the perimeter of water heater 22.

As shown in FIGS. 1 and 7, a fulcrum arm 32 is pivotally hinged to a base 34 at pivot 37. For illustrative purposes only, in one embodiment base 34 can stand at about 4.4 (about 112 mms) inches in height. Base 34 can be formed from a variety of rigid materials to provide stability to the lever action of the float and can be fixed to the floor or within the catch basin (FIG. 1), attached to the wall of the catch basin (not shown), or outside of the catch basin (FIG. 7. Again, for illustrative purposes, the length of fulcrum arm 32 can be about 5.5 (about 140 mms) inches. In this embodiment, at about ¾" (about 19 mms) from the axis point 37 of fulcrum arm 32 to base 34, a pivot point 35, such as a hinged clevis, is attached. At the distal end of the fulcrum a float 30 is attached. Float 30 can be formed from a variety of materials configured to be buoyant relative to the fluid 28. For example, where fluid 28 is water, the float can be made from cork, wood, closed cell foams (such as a closed cell extruded polystyrene foam sold under the trade name STYROFOAM), and the like. In embodiments using a closed cell STYROFOAM, float 30 can have a volume of about 16.5 square inches (420 sq mms) and/or measure about 1.5" (38 mms) wide, about 5.5" (140 mms) long, and about 2" (51 mms) high. In any event, the float should be able to generate approximately at least about one (1) pound (about 450 gms) of lift force (buoyancy) when submerged in the fluid/water.

As the more lift is applied to float 30 at the end of fulcrum arm 32, pivot point on fulcrum arm to rod 36 can be configured to be at a point where the transferred force provides about six pounds (about 2700 gms) of lift. Accordingly, at point 35, a rod 36 is disposed along the length of the fulcrum arm 32 so that 6 pounds (about 2700 gms) of lift can thus be applied to rod 36. In other words, rod 36 is positioned at a point of the fulcrum arm such that 6 times the buoyant force of the float is applied. In another example, rod 36 can be positioned on fulcrum arm such that the force ultimately applied to a latch arm (see below) can be, for example, up to about 1.5 pounds (about 680 gms). Ultimately, the force applied would be sufficient to release the latch arm. This desired force would need to consider several factors such as the friction of all the components, the weight of the components (e.g., the weight of rod 36), the potentially predicted buildup of dust/debris that may occur among the components over time, and the like.

Attached to the clevis is a rod 36. Rod 36 can be any rigid rod that can transfer the buoyant force of the float to the shut-off assembly as described below. Rod diameter, length, weight, density, desired rigidity and cost can be configured for specific applications. For example, rods can be formed from stainless steel, carbon fiber, wood, plastics, other types of steel (such as a typical number 8 threaded metal rod) can be used. Rod 36 extends from the clevis 35 toward a shut off valve assemble 38. Positioning, securing and protecting rod 36 can be achieved by sleeves and guides along its length (not shown).

Shut-off valve assembly 50 can include a shut off valve such as a handle activated ¾" (about 19 mms), four bolt, quarter-turn ball valve. While the shut-off valve is described for a quarter-turn ball valve, it is noted that other types of shut-off valves could also be within the scope of the present embodiments. Exemplary shut-off valves could also include: butterfly valves, gate valves, piston valves, and the like.

The actuation assembly 38 components, as shown, can be bolted onto valve 50. Assembly 38 can provide a valve assembly shut-off base 40 that has a guide (as shown a valve assembly rod guide with a rod arm bore 44) for rod 36 to travel freely through and to guide rod 36 to a latch arm 42.

An area of base 40 can have a notch cutout 45 at the guide hole. Base 40 and latch arm 42 can be formed of a variety of materials including metals and plastics. For example, plastic embodiments can include acetal polymer materials, such as one sold under the trade name DELRIN. As shown, base 40 is 'upstream' in the fluid supply of shut off valve 50. It is noted though that the present embodiments can be practiced so the base 40 can be on either side of shut off valve 50.

Figure 3:
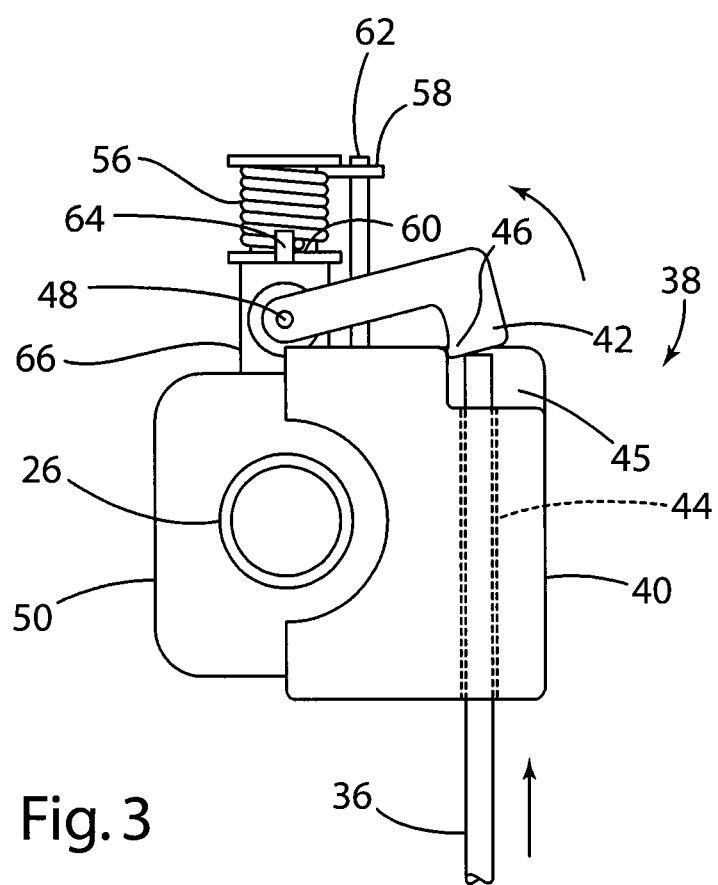
FIG. 3 is a sectional view of an embodiment of the present devices taken along section lines II-II in FIG. 1 upon activation by the float.
Figure 4:
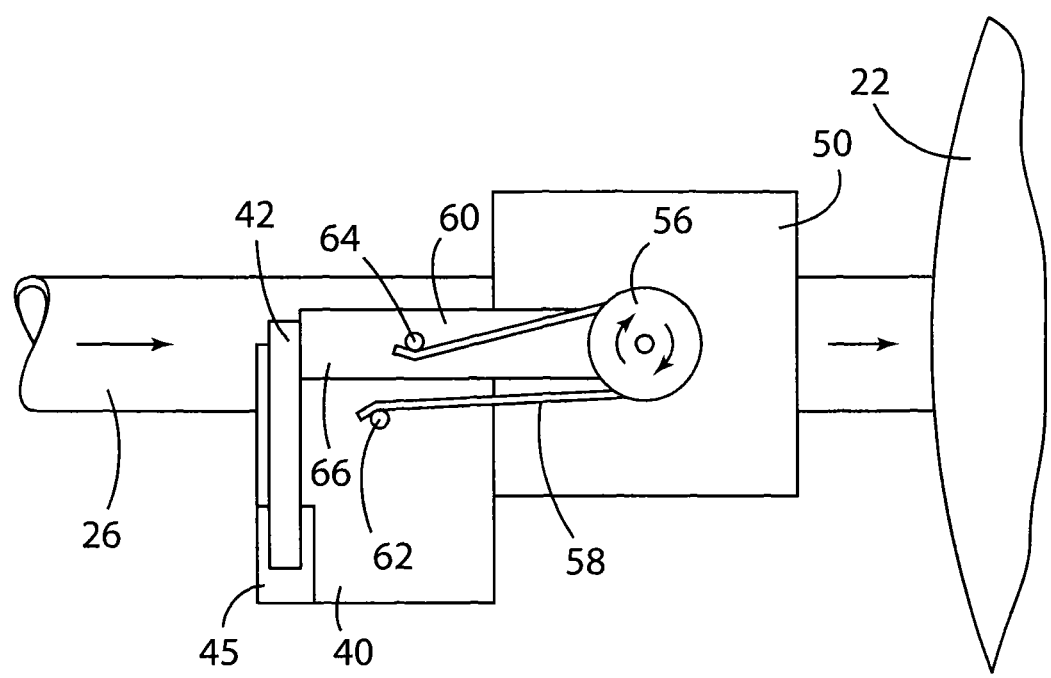
FIG. 4 is a top view of an embodiment of the present devices.
Figure 5:
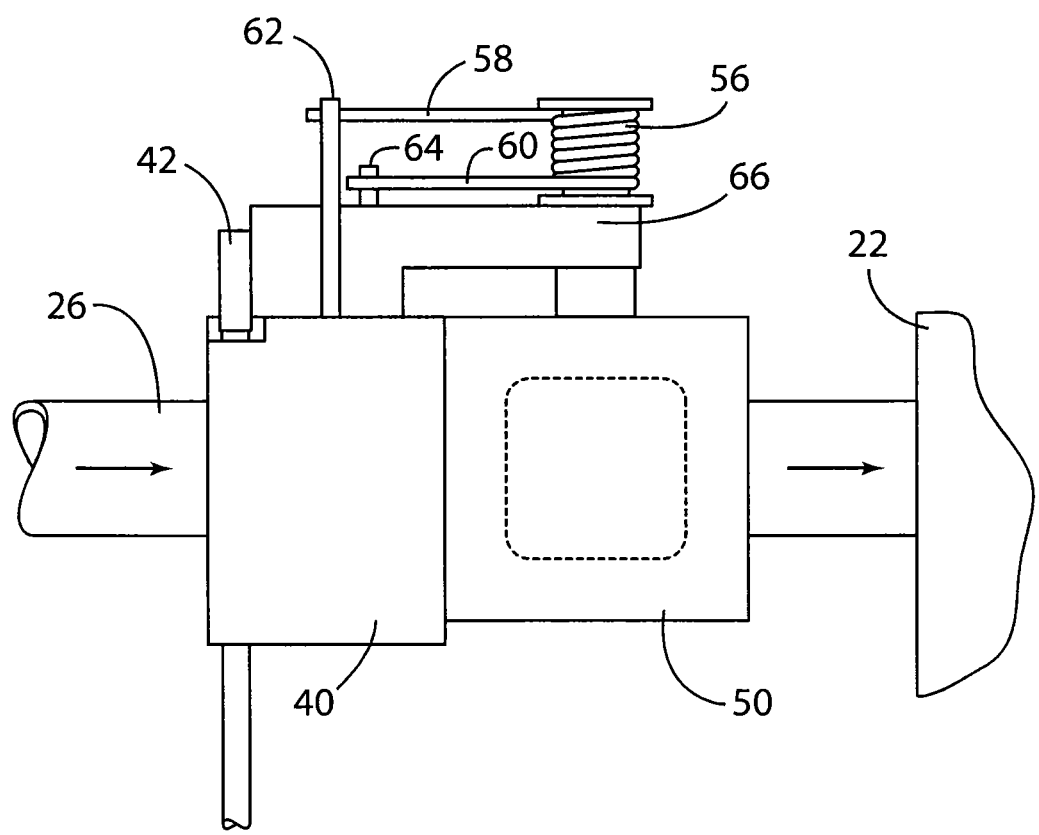
FIG. 5 is a side view of an embodiment of the present devices.

As shown in FIG. 3, as rod 36 rises, such as in response to a rising float in a catch basin, rod 36 end applies the rising force against an end of latch arm 42. As latch arm 42 is displaced upward, it rotates about a latch arm axis point 48 that is connected to the end of a handle 66, which as shown is rotatable against an axis perpendicular to the pivot of latch arm 42. Handle 66 turning about its axis cause valve 50 to rotate to an open or closed position. When latch arm 42 is held in place by shut-off base notch 45, valve 50 is maintained in an open position to allow flow of fluid through the water supply 26.

As latch arm is displaced and extends beyond shut-off base notch 45, handle 66 is under a rotational force to close by a torsion spring 56 mounted, in this illustration above valve 50. It is noted though that some embodiments can be configured to employ a coil spring, though a torsion spring is preferred as it allows for a more efficient, cost effective and compact design. The ends 58 and 60 of torsion spring 56 are preferably in a generally parallel orientation held in place by raised stops 64 and 62 respectively on handle 66 and a rod anchored by the base 40. The torsion spring 56 can be formed from a variety of materials such as music wire with a diameter of 0.105 inches, and free position of ends turning radius of 360 degrees. Torsion spring 56 can be wound about a spool, for example, a 1 and ⅜" spool (i.e., about 35 mms). In any event, torsion spring must be able to provide enough force to rotate valve 50 in the presence of the fluid under pressure. For most embodiments, torsion spring 56 should be able to generate at least 18 pounds (about 8164 gms) of force. In one embodiment, torsion spring 56 can generate about 21 lbs (about 9500 gms) of force.

Figure 6A:
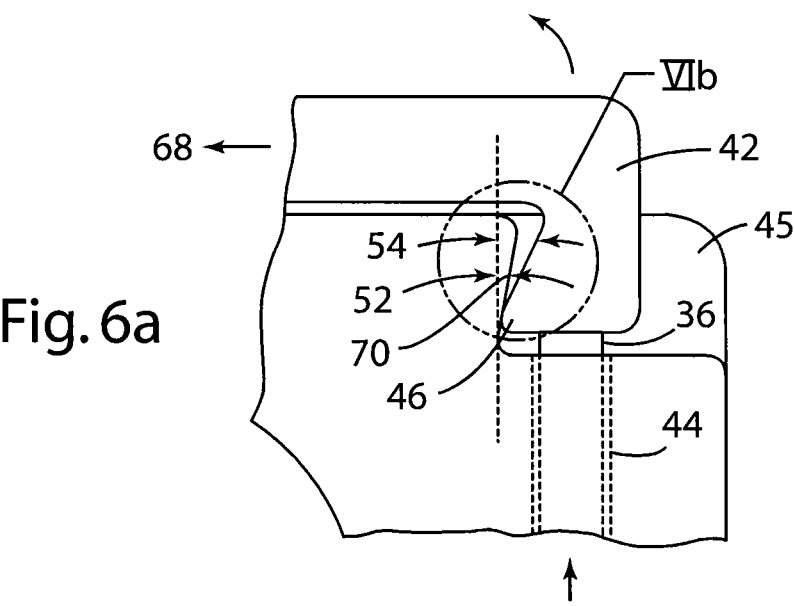
FIG. 6 is a detail view of Area VI indicated in FIG. 2.
Figure 6B:
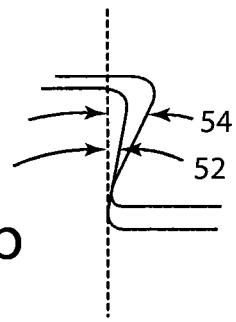

Returning to the latch arm, as described above, disposed at the end of handle 66 a pivotable (at 48) latch arm 42. Latch arm 42, as shown, is "L" shaped and rests in cutout notch 45 in base 40 as shown in FIG. 6. Again, cutout notch 45 and the 'L' shaped latch arm 42 are made from a material that is strong enough to hold the full force of the spring tension and have a low coefficient of friction to allow latch arm to be displaced upward under the rising force of rod 36. Latch arm 42 and notch 45 are also configured by their angular orientation to retain the latch arm 42 at the bottom of notch 42.

As shown most clearly in FIG. 6, latch arm 42 can be held in place under the force of the torsion spring in the direction shown at 68. Latch arm 42 can optionally have an angle 54 (such as a 5.5 degree angle). An angle 52 (such as about a 3.5 degree angle) can also be optionally formed on side wall 70 contact surface of cutout notch 45 on base 40 to drive the latch arm apex point 46 in and down along the side wall 70 until it reaches a point where it can be positioned approximately adjacent to the end of rod 36 to allow engagement as rod 36 raises. With the force at these contact surfaces, the angles provide a desired downward pull configuration on the latch arm to prevent its inadvertent release. Given the pre-configured angles and coefficient of friction, the force needed to move the latch arm 42 above side wall 70 can be calculated with predictability. Further angle 54 can be configured to provide clearance as it traverses upward along side wall 70.

Figure 8:
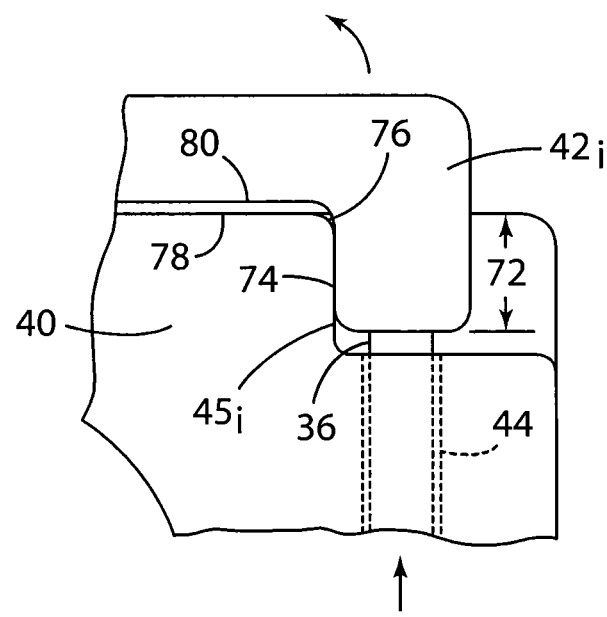
FIG. 8 is an alternate embodiment of the present device latch arm and base notch.

An alternate latch arm retention configuration is illustrated in FIG. 8. As shown, latch arm 42i edge 76 is held against base 40i on its side wall 74. Edge 76 and sidewall 74 are generally parallel and at right angles to latch arm lower edge 80 and base top 78 respectively. The right angles allow ease of manufacturing, such as for injected molded plastic components. It is noted that the end portion of the "L" of latch arm 42i is configured to be a length 72 to allow a preconfigured force (such as at least 1.5 pounds of force) to overcome the friction between surfaces 74 and 76 and allow the latch arm to swing upward from the force generated by the raising of rod 36.

Accordingly, in use, as fluid reservoir 24 fills with fluid 28, float 30 is lifted. Float 30 raises the end of lever arm 32 acting as a fulcrum lifting rod 36. As rod 36 raises, it applies force to end of latch arm 42 to overcome the down and inward force of the torsion spring 56 provided by angles 54 and 52. Upon the latch arm end reaching the top edge of side wall 70, the full force of torsion spring 56 is released to rotate valve handle 66 from an open position to the closed position.

A clear advantage of the current device is that it is totally mechanical. The device can also be custom fitted to any size water heater without major re-routing of plumbing. It can be configured to trigger with a water lever of about 0.5-2 inches (about 12 to 50 mms) within the catch basin. Optimally the device is made from materials that resist corrosion and wear such as material sold under the trade name of DELRIN.

While the products and methods have been described in conjunction with specific embodiments, it is evident that many alternatives, modifications, and variations will be apparent to those skilled in the art in light of the foregoing description.

We claim:
1. An automatic fluid shut off device, comprising:
   a float disposed in a fluid catch basin attached to a first end of a rod movable in a direction of rising fluid in the catch basin;
   a second rod end of the movable rod extending into a bore of an actuation assembly having a fluid supply base;
   the second rod end terminating adjacent to a restrained latch arm end of the actuation assembly;
   the latch arm end configured to be pivotably displaceable upon a force by the second rod end in response to a rising fluid in the catch basin;
   the latch arm pivotably connected to a handle of the actuation assembly turnable on an axis to cause a shut-off valve to rotate to an open and closed position; and
   the shut off valve retained in an open position while the latch arm is restrained, and under a rotational force to close the shut-off valve upon a release of the latch arm in response to the force by the second rod end.
2. The device of claim 1, wherein the latch arm is restrained by a latch arm retention notch extending downward and inward at about a 3.5 degree angle.
3. The device of claim 1, wherein a buoyancy force of the float is up to 680 gms against the latch arm and the rotational force against the shut-off valve is greater than 8164 grams.
4. The device of claim 1, wherein the rotation force is supplied by a torsion spring.
5. The device of claim 4, wherein the torsion spring is formed from music wire with a diameter of 3 mm.

6. The device of claim 1, wherein the shut-off valve is 19 mm in diameter.

7. The device of claim 1, wherein the base and latch arm are formed from and acetal polymer.

8. The device of claim 1, wherein the catch basin is disposed under a water heater and is configured to displace the latch arm to a point of release in response of 25 to 50 mm of water in the catch basin.

9. A method to shut off a water supply, comprising the steps of:
   using the device of claim 1 for providing a first force in response to unanticipated presence of a fluid;
   displacing a restrained latch arm connected to a shut-off valve handle past a stop in response to the first force;
   rotating the shut-off valve connected to a fluid supply by a second force in response to a latch arm displacement beyond a release point.

10. The method of claim 9, wherein the restrained latch arm is restrained by the second force.

11. The method of claim 9, wherein the first force is provided by a buoyancy force and the second force is provided by a torsion spring.

12. The method of claim 11, wherein the first force is 680 gms and the second for is greater than 8164 grams.

* * * * *